United States Patent
Srinivasa et al.

(10) Patent No.: US 10,120,690 B1
(45) Date of Patent: Nov. 6, 2018

(54) RESERVATION STATION EARLY AGE INDICATOR GENERATION

(71) Applicant: Apple Inc., Cupertino, CA (US)

(72) Inventors: Skanda K. Srinivasa, Austin, TX (US); Jonathan Jay Tyler, Austin, TX (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 15/181,183

(22) Filed: Jun. 13, 2016

(51) Int. Cl.
*G06F 9/30* (2018.01)
*G06F 1/14* (2006.01)

(52) U.S. Cl.
CPC .......... *G06F 9/30145* (2013.01); *G06F 1/14* (2013.01)

(58) Field of Classification Search
None
See application file for complete search history.

(56) References Cited

U.S. PATENT DOCUMENTS

| | | | |
|---|---|---|---|
| 9,336,003 B2 | 5/2016 | Mylius et al. | |
| 9,367,322 B1* | 6/2016 | Brownscheidle | G06F 9/3836 |
| 9,740,495 B2* | 8/2017 | Guo | G06F 9/3855 |
| 2006/0179346 A1* | 8/2006 | Bishop | G06F 11/1407 |
| | | | 714/13 |
| 2007/0198812 A1* | 8/2007 | Abernathy | G06F 9/3836 |
| | | | 712/214 |
| 2011/0185159 A1* | 7/2011 | Bishop | G06F 9/3855 |
| | | | 712/208 |
| 2017/0024205 A1 | 1/2017 | Kountanis et al. | |

\* cited by examiner

*Primary Examiner* — Eric Coleman
(74) *Attorney, Agent, or Firm* — Meyertons Hood Kivlin Kowert and Goetzel PC; Rory D. Rankin

(57) ABSTRACT

Systems, apparatuses, and methods for pre-computing early age indicators for a non-shifting reservation station. A reservation station may include a plurality of entries storing a plurality of instruction operations prior to issuance to an execution unit. The reservation station may include control logic for pre-computing early age indicators for specifying which entry of each adjacent pair of entries is the oldest ready instruction operation. The early age indicators may be routed through registers and then through additional levels of control logic for determining the oldest ready instruction operation in all of the entries of the reservation station.

20 Claims, 8 Drawing Sheets

RESERVATION STATION EARLY AGE INDICATOR GENERATION

BACKGROUND

Technical Field

Embodiments described herein relate to the field of processors and more particularly, to implementing scheduling operations for execution.

Description of the Related Art

A processor is generally hardware circuitry designed to execute instructions defined by a particular instruction set architecture. While the instructions are being processed, the processor may store the instructions in one or more reservation stations. Each reservation station may be coupled to a respective execution unit and may be configured to schedule instruction operations for execution in the respective execution unit.

A reservation station holds state information for instruction operations waiting to be issued to the processor's execution unit(s). Most reservation stations are shifting structures, with instruction operations coming into one side (e.g., the bottom) of the reservation station with existing instruction operations shifted up as new instruction operations come into the reservation station. Shifting reservation stations write the same instruction operation multiple times as the instruction operation shifts through the structure, burning power unnecessarily. This shifting results in a lot of extra writes and wasted power as the instruction operations are moved through the reservation station. For example, if three instruction operations are shifted into the reservation station in a given clock cycle, this results in three writes, plus potentially three more writes as three existing instruction operations are shifted up to higher slots in the reservation station. Furthermore, for a shifting reservation station, the fuller the reservation station becomes, the more power it consumes, since a single instruction operation written into the reservation station can cause an almost full reservation station to shift up multiple entries to make room for the new instruction operation.

SUMMARY

Systems, apparatuses, and methods for pre-computing early age indicators for a reservation station are contemplated.

In various embodiments, a processor may include at least one or more reservation stations and one or more execution units. Each reservation station may include a plurality of entries for storing a plurality of instruction operations for issuance to a corresponding execution unit. Each reservation station may also include an age matrix, control logic, and selection logic for selecting operations to issue to a corresponding execution unit. The age matrix may include an age vector for each entry of the reservation station, and each age vector may include indicators designating a relative age of the instruction operation in comparison to other instruction operations stored in the reservation station. The selection logic may be configured to utilize early age indicators and the age matrix for determining and issuing the oldest ready instruction operations from the reservation station to an execution unit.

In one embodiment, the control logic may pre-compute an early age indicator for each pair of adjacent entries in the reservation station. The early age indicators may be pre-computed based at least in part on status data from a previous clock cycle. Each early age indicator specifies which entry of the pair is the older ready entry. The early age indicators may be used as a first level of multiplexing while the age vectors are evaluated to determine the oldest ready instruction operation within all of the entries of the reservation station. By pre-computing the early age indicators between pairs of entries, the critical path of the age matrix is reduced and the correct entry is still selected. By reducing the critical path of the age matrix, instructions can be selected for execution at a higher rate, resulting in an increase in the number of instructions that can be executed by the processor in a given period of time. Any device using the processor would benefit by having increased capabilities resulting from the ability to execute instructions at a faster rate. This can be useful for devices with multi-tasking processors which perform multiple functions (e.g., processing data received over a network, preparing data for display on a display device, responding to user inputs, running multiple applications) simultaneously. Furthermore, reducing the critical path of the age matrix may allow smaller logic gates to be used for implementing the critical path, resulting in power savings. For mobile devices which derive the energy required for their operation from batteries, a reduction in the power consumption of the mobile device's processor(s) can result in the device lasting longer on a single battery charge.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
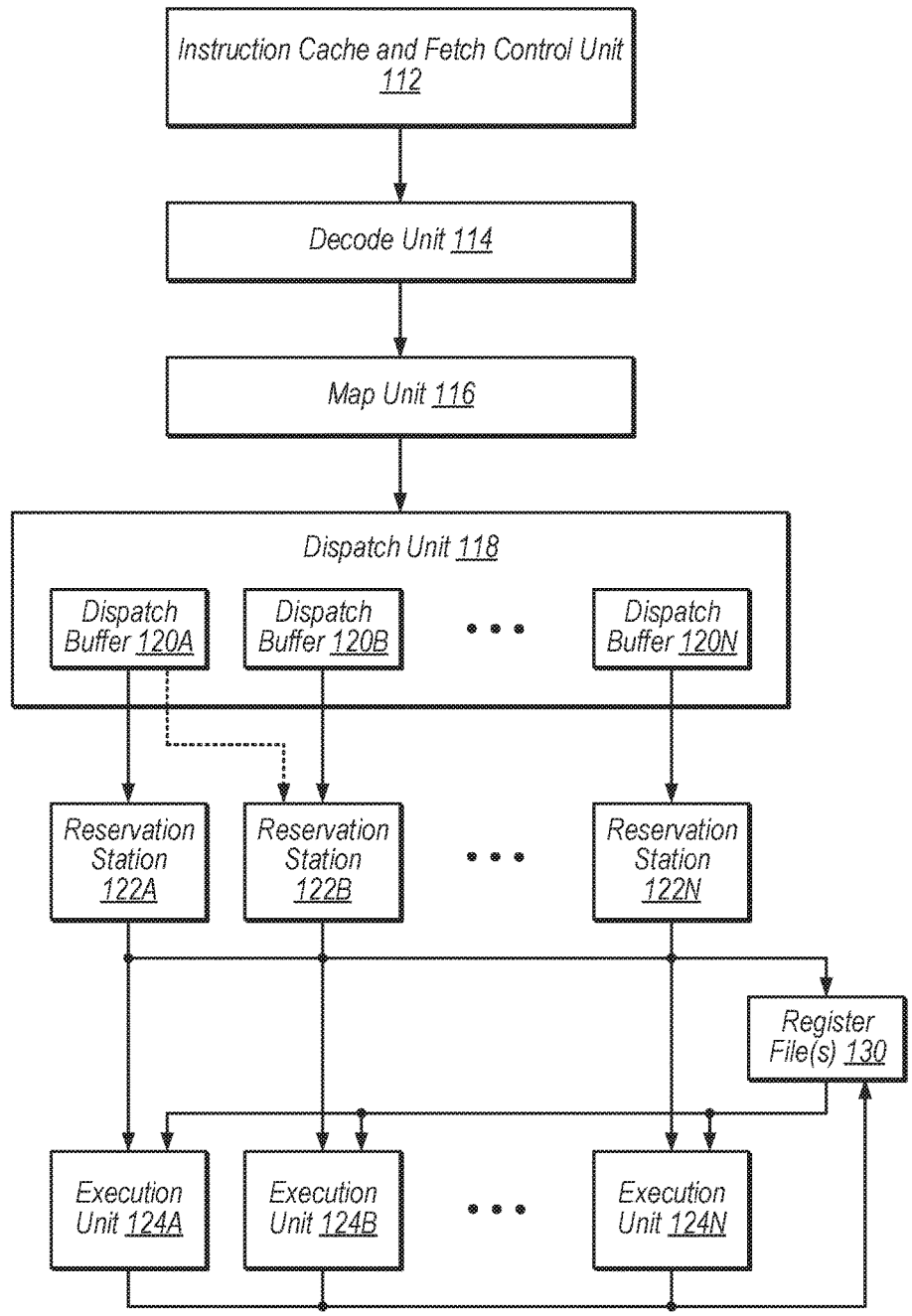
FIG. 1 is a block diagram illustrating one embodiment of a portion of a processor.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of a portion of a processor 100 is shown. In the illustrated embodiment, the processor 100 includes an instruction cache and fetch control unit 112, a decode unit 114, a map unit 116, a dispatch unit 118, a set of reservation stations 122A-122N, a set of execution units 124A-124N, and one or more register files 130. The instruction cache and fetch control unit 112 is coupled to the decode unit 114, which is coupled to the map unit 116. The map unit 116 is coupled to the dispatch unit 118, which is further coupled to the reservation stations 122A-122N. The reservation stations 122A-122N are coupled to respective execution units 124A-124N and the register file(s) 130. The register file(s) 130 are further coupled to the execution units 124A-124N. It is noted that processor 100 may include other components and interfaces not shown in FIG. 1.

In one embodiment, the dispatch unit 118 may include a set of dispatch buffers 120A-120N, which are representative of any number of dispatch buffers. Each of the dispatch buffers 120A-120N is coupled to a corresponding reservation station 122A-122N. For example, dispatch buffer 120A is coupled to reservation station 122A. Additionally, in some embodiments, dispatch buffer 120A may also be coupled to reservation station 122B and/or one or more other reservation stations. Similarly, dispatch buffer 120B is coupled to reservation station 122B and may also be coupled to one or more other reservation stations. It should be understood that any configuration of dispatch buffers and reservation stations may be utilized depending on the embodiment. For example, in another embodiment, each dispatch buffer 120 may be coupled to two separate reservation stations 122. Other embodiments may implement more than two reservation stations per dispatch buffer 120, if desired.

In various embodiments, instruction operations may be captured by the dispatch buffers 120A-120N based on the type of instruction operation (e.g. integer, load/store, or floating point). It is noted that the term "instruction operation" may be more briefly referred to herein as an "op". In one embodiment, load/store ops may be captured by dispatch buffer 120A, which may coupled to a load/store reservation station 122A, which may be further coupled to a load/store execution unit 124A. In this embodiment, integer ops may be captured by the dispatch buffer 120B and floating point ops may be captured by dispatch buffer 120N. Alternatively, in another embodiment, dispatch buffer 120A may be coupled to two load/store reservation stations 122A-B, which may each be coupled to a corresponding load/store execution unit 124A-B. More than one integer reservation station and/or more than one floating point reservation station may also be utilized, depending on the embodiment.

Among ops of a given type, more than one of the dispatch buffers 120A-120N may be eligible to receive the ops. For example, integer ops may be received by multiple of dispatch buffers 120A-120N. Some ops may be restricted to a particular dispatch buffer, dependent on the hardware implemented in the corresponding execution units. For example, the execution unit 124A may be the only integer execution unit with a multiplier in one embodiment. Similarly, the execution unit 124B may be the only integer execution unit with a divider in one embodiment. Still further, the execution unit 124N may be the only unit having branch processing circuitry. Other integer ops (e.g. add/subtract ops, logical ops, shift/rotate ops, etc.) may be executed by any integer execution unit of execution units 124A-N. Other embodiments may include different hardware definitions and different numbers of execution units having specific execution hardware, as desired.

The instruction cache and fetch control unit 112 may be configured to cache instructions previously fetched from memory, and may be configured to speculatively fetch a stream of instructions for the processor 100. The instruction cache and fetch control unit 112 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 114 may be configured to decode the instructions into instruction operations that are executable by the execution units 124A-124N. In some embodiments, a given instruction may be decoded into one or more instruction operations, depending on the complexity of the instruction. Particularly complex instructions may be microcoded, in some embodiments. In such embodiments, the microcode routine for the instruction may be coded in micro-ops (or μops). For the purposes of simplicity, the terms "instruction operation", "op", and "μop" may be used interchangeably herein. In other embodiments, each instruction in the instruction set architecture implemented by the processor 100 may be decoded into a single instruction operation, and thus the instruction operation may be essentially synonymous with the instruction (although it may be modified in form by the decoder). The map unit 116 may be configured to perform register renaming on the ops, assigning physical registers in the register files 130 for each source and destination register in the ops. In one embodiment, map unit 116 may be configured to generate dependency vectors for the ops, wherein the dependency vectors identify the ops on which a given op is dependent. The map unit 116 may provide the dependency vectors for each op to dispatch unit 118 and/or reservation stations 122A-N.

In one embodiment, the reservation stations 122A-122N may each store ops to be executed by a corresponding execution unit 124A-124N. That is, in this embodiment, there is a one-to-one correspondence between reservation stations 122A-122N and execution units 124A-124N. The reservation stations 122A-122N may be configured to track dependencies of the ops stored therein, and may be configured to schedule ops for which the dependencies have been satisfied (or are currently being satisfied by an executing op which will forward the result data to the op). In this embodiment, the reservation stations 122A-122N may track dependencies but may not actually capture operand data. Instead, register files 130 may be used to read the operand data (and there may be forwarding paths for results generated by the execution units 124A-124N). Thus, the reservation stations 122A-122N may include storage implementing a number of entries for ops (e.g., random access memory arrays, flops, registers) as well as control circuitry configured to track/resolve dependencies and to schedule ops. Other embodiments may be configured to capture the operand data in the reservation stations as well. In such embodiments, the register files 130 may be read as each op enters the reservation stations 122A-122N, and forwarded results may be captured by the reservation stations 122A-122N in addition to the register files 130 updating with the forwarded results.

The register files 130 may be one or more sets of physical registers which may be mapped to the architected registers coded into the instructions stored in the instruction cache and fetch control unit 112. There may be separate physical registers for different operand types (e.g., integer, media, floating point) in an embodiment. In other embodiments, the physical registers may be shared over operand types. The register files 130 may be configured to output operands read in response to ops issued for execution by the reservation stations 122A-122N to the respective execution units 124A-124N. The register files 130 may also be configured to capture results generated by the execution units 124A-124N and written to the destination registers of the ops.

One or more of execution units 124A-124N may be an integer execution unit which is configured to execute integer ops. Generally, an integer op is an op which performs a defined operation on integer operands. Integers may be numeric values in which each value corresponds to a mathematical integer. Different circuitry may be allocated to different ones of execution units 124A-124N for performing different types of operations on integer operands. For example, a first execution unit 124 may include a multiplier, a second execution unit 124 may include a divider, a third execution unit 124 may include branch processing hardware to process branch ops, and so on. In one embodiment, each of the integer execution units may include adder hardware, shift/rotate hardware, logical operation hardware, etc. to perform dynamically-assigned integer operations.

One or more of execution units 124A-124N may be a load/store execution unit which is configured to execute load/store ops. Generally, a load op may specify a transfer of data from a memory location to a register, while a store op may specify a transfer of data from a register to a memory location. The load/store execution unit(s) may include load queues, store queues, and/or load/store queues to handle load/store ops that have generated memory addresses but are awaiting cache fills or to commit data to the cache or memory. A data cache, not shown, may be coupled to the load/store execution units and may be accessed to complete load/store ops without transmission to the memory subsystem in the case of a cache hit.

One or more of execution units 124A-124N may be a floating point execution unit which is configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment). In various embodiments, additional execution units of other types may also be included (e.g., media units).

Each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit 124A-124N may be an independent pipe for executing ops. The reservation stations 122A-122N may be part of the independent pipe with the corresponding execution unit 124A-124N.

Figure 2:
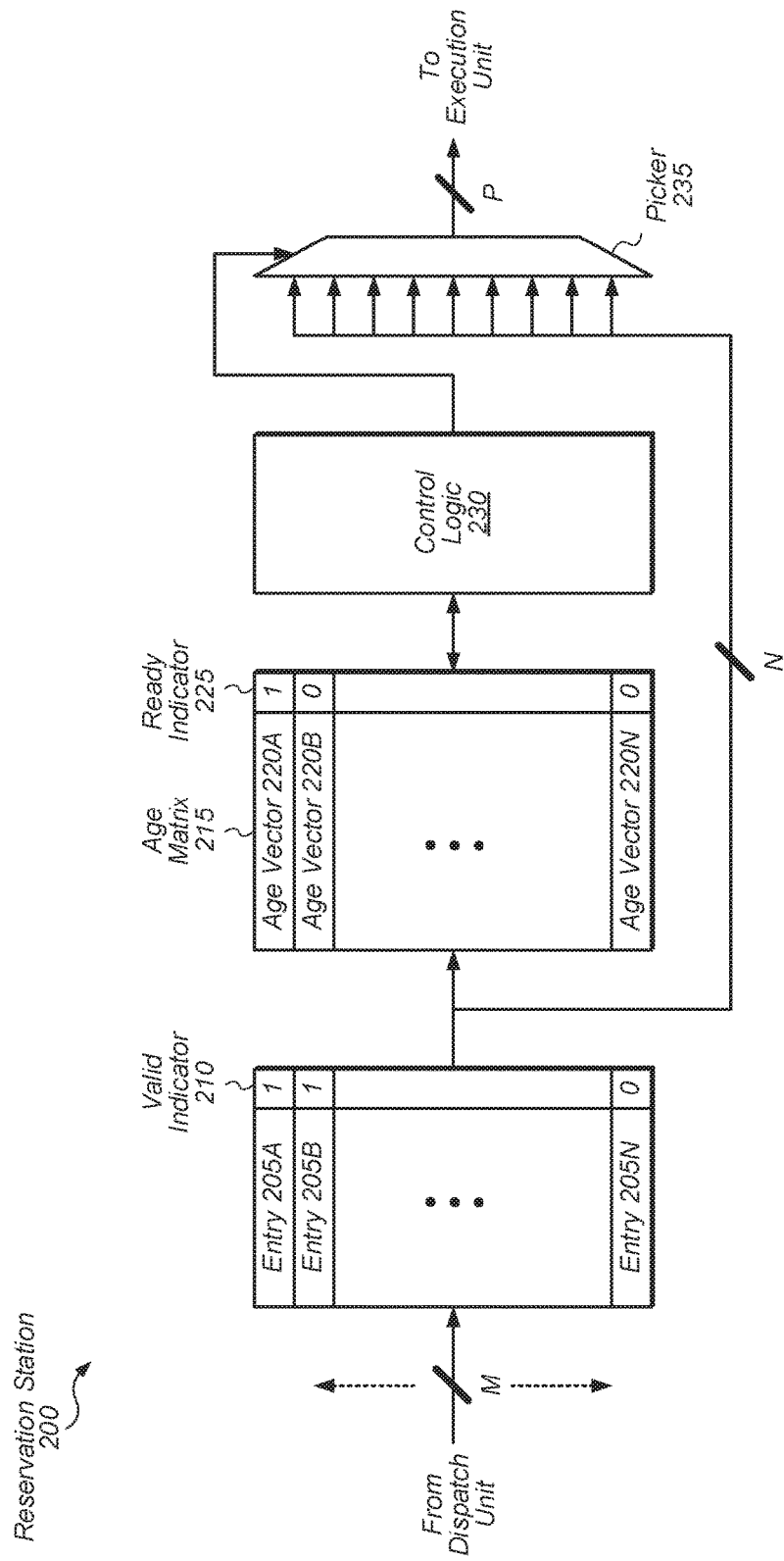
FIG. 2 is a block diagram of one embodiment of a reservation station.

Turning now to FIG. 2, a generalized block diagram of one embodiment of a non-shifting reservation station 200 is shown. Reservation station 200 includes entries 205A-N, age matrix 215, control logic 230, and selection logic (picker 235). In one embodiment, entries 205A-N of reservation station 200 may be randomly allocated. In other words, reservation station 200 may be a non-shifting reservation station. A dispatch unit (not shown) may be configured to dispatch up to 'M' ops per cycle to reservation station 200, wherein 'M' is a positive integer. Additionally, the dispatch unit may be configured to dispatch an op to any of the entries 205A-N of reservation station 200. In various embodiments, the dispatch unit may be configured to maintain a free list of reservation station entries for use in determining where to write ops in reservation station 200.

Each entry 205A-N may store an op dispatched from the dispatch unit. Each entry 205A-N may also include a valid indicator 210 (e.g., a single bit '1' or '0') to indicate if the entry contains a valid op. Each entry 205A-N may also include any number of other fields associated with the op, depending on the embodiment. Reservation station 200 may also include age matrix 215, which includes age vectors 220A-N corresponding to entries 205A-N. Each age vector 220A-N may indicate if the corresponding entry's op is older than the other ops in the other entries 205A-N. Reservation station 200 may also include a ready indicator 225 for each entry 205A-N to indicate if the op in the corresponding entry is ready to be issued. In various embodiments, an entry may be ready to be issued if all of the op's sources are ready.

In one embodiment, a subset (i.e., fewer than all entries) of the age matrix 215 may be utilized to generate early age indicators for pairs of entries. Each early age indicator may indicate which entry of the pair is the older ready entry. Then, the entirety of age matrix 215 may be utilized to select the oldest ready entry from all of the entries 205A-N. In another embodiment, age matrix 215 may include two structures, with the first structure used for generating early age indicators, and the second structure used for selecting the oldest ready entry from all of the entries 205A-N. The first structure may include age indicators from a previous clock cycle, while the second structure may include age vectors which have been updated for the current clock cycle.

Control logic 230 may be configured to determine the oldest ready entry of entries 205A-N. In one embodiment, control logic 230 may pre-compute early age indicators for adjacent entries of entries 205A-N. Control logic 230 may utilize the early age indicators within a first level of multiplexers and then clock the early age indicators through one or more additional levels of multiplexers. By pre-computing the early age indicators, control logic 230 reduces the critical path of determining the oldest ready entry.

Picker 235 is representative of any number of pickers which may be utilized with reservation station 200. In one embodiment, picker 235 may be configured to select the 'P' oldest ready ops from entries 205A-N in a given clock cycle for issuance to a corresponding execution unit (not shown), wherein 'P' is a positive integer. In some embodiments, picker 235 may be a multiplexer and/or other logic that is configured to select ops based on instructions or signals received from control logic 230.

Figure 3:
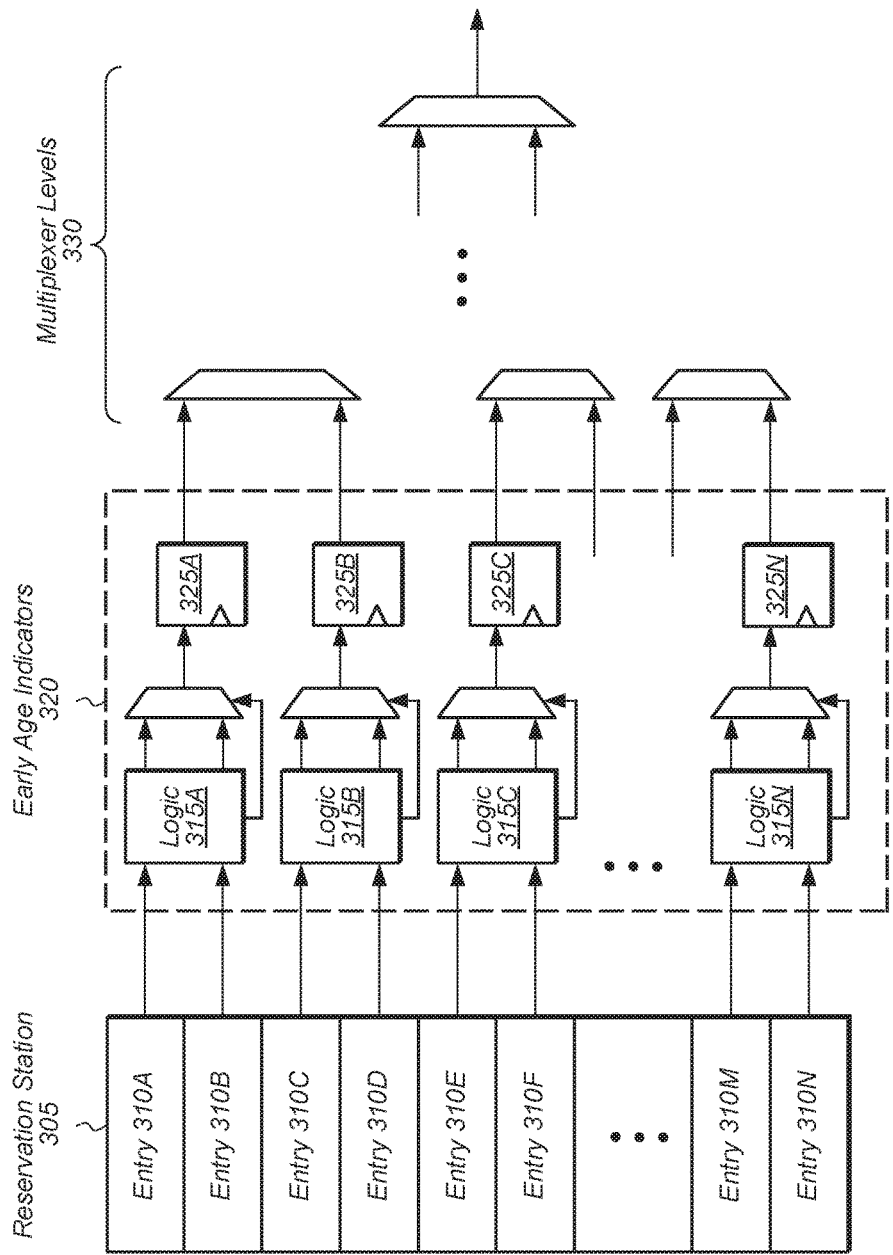
FIG. 3 is a block diagram of one embodiment of a reservation station and early age indicators.

Referring now to FIG. 3, a block diagram of one embodiment of a reservation station 305 and early age indicators 320 are shown. Reservation station 305 may have any number of entries 310A-N, depending on the embodiment. For each pair of entries, an early age indicator 320 may be generated based on status data from a previous clock cycle. This allows the multiplexer levels 330 to utilize less logic and meet timing constraints.

Each pair of entries of reservation station 305 may be coupled through logic 315A-N to a mux which generates an early age indicator for the pair of entries. Control logic 315A-N may be coupled to each mux to select the oldest ready entry from the pair of entries based at least in part on status data from the previous clock cycle. The status data may include an age indicator from the age matrix for the two entries from the previous clock cycle and allocated, valid, and ready indicators for the two entries from the current clock cycle. The early age indicators may be coupled to multiplexer levels 330 via registers 325A-N. By using the age indicator corresponding to the pair of entries from the previous clock cycle, the early age indicators may be ready at the start of the next clock cycle, which eases the timing requirements on the rest of the logic in multiplexer levels 330.

Figure 4:
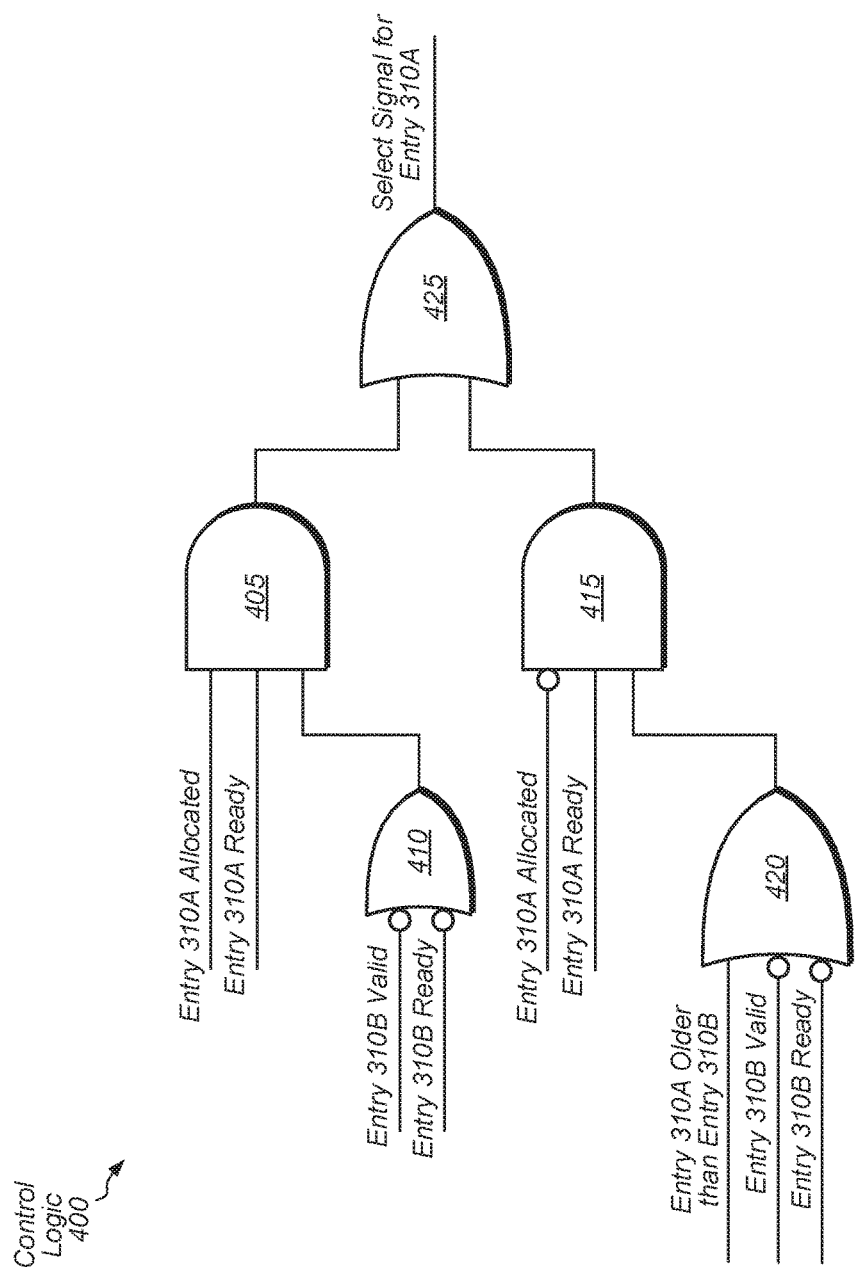
FIG. 4 is a block diagram of one embodiment of reservation station control logic.

Turning now to FIG. 4, a block diagram of one embodiment of control logic 400 is shown. In one embodiment, control logic 400 may be included within logic unit 315A (of FIG. 3). Control logic 400 may be implemented for generating the select signal for entry 310A of FIG. 3. Control logic 400 may include AND-gate 405, OR-gate 410, AND-gate 415, OR-gate 420, and OR-gate 425.

Signals indicating if entry 310A is allocated and if entry 310A is ready may be coupled to inputs of AND-gate 405. The other input to AND-gate 405 may be connected from the output of OR-gate 410. The valid signal of entry 310B (of FIG. 3) may be negated and coupled to an input of OR-gate 410. The ready signal of entry 310B may be negated and coupled to the other input of OR-gate 410. The output of OR-gate 410 may be coupled to the input of AND-gate 405.

The signal indicating if entry 310A is allocated may be negated and coupled to an input of AND-gate 415. The ready signal of entry 310A may be coupled to another input of AND-gate 415. The other input to AND-gate 415 may be connected from the output of OR-gate 420. A value from the age matrix (e.g., age matrix 215 of FIG. 2) may be retrieved and coupled to an input of OR-gate 420. This age matrix value may indicate if entry 310A is older than entry 310B. In one embodiment, this age matrix value indicating if entry 310A is older than entry 310B may be from the previous clock cycle.

The valid signal of entry 310B may be negated and coupled to another input of OR-gate 420. The ready signal of entry 310B may be negated and coupled to another input of OR-gate 420. The output of OR-gate 420 may be coupled to an input of AND-gate 415. The outputs of AND-gate 405 and AND-gate 415 may be coupled to the inputs of OR-gate 425. The output of OR-gate 425 may be the select signal for entry 310A. Control logic for generating the select signal for entry 310B may be similar to control logic 400 shown in FIG. 4. It is noted that control logic 400 is intended to represent one possible implementation of logic that may be included within logic 315A. In other embodiments, control logic 400 may include other logic gates and/or may be structured differently.

Figure 5:
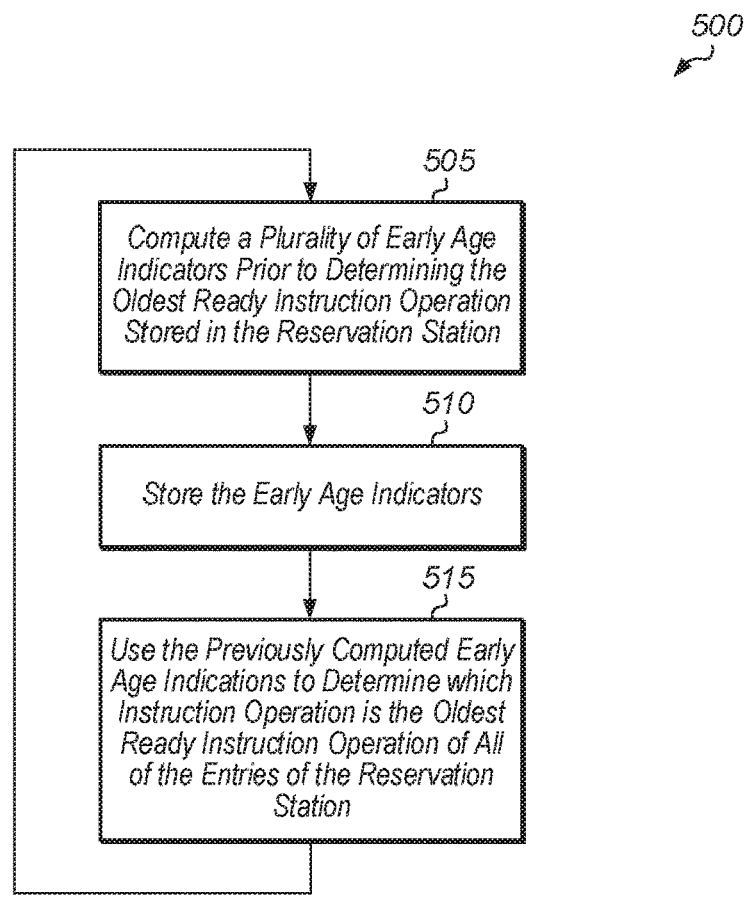
FIG. 5 is a generalized flow diagram illustrating one embodiment of a method for utilizing early age indicators in a reservation station.

Turning now to FIG. 5, one embodiment of a method 500 for utilizing early age indicators in a reservation station is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 500.

A plurality of early age indicators may be computed prior to determining the oldest ready instruction operation of all of the instruction operations stored in the reservation station of a processor (block 505). In various embodiments, the processor may be included within a host device, wherein the host device is a smartphone, tablet, laptop computer, desktop computer, watch, server, programmable consumer electronic device, set-top box, television, satellite receiver, or other electronic device or computing system. Each early age indicator may specify which entry is an oldest ready entry of a subset of entries of the reservation station. In one embodiment, an early age indicator may be generated for each adjacent pair of entries of the reservation station. In other embodiments, an early age indicator may be generated for other numbers (e.g., 3, 4) of subsets of entries.

Next, the early age indicators may be stored (block 510). Then, the previously computed early age indicators may be used for determining which instruction operation is the oldest ready instruction operation of the all of the entries of the reservation station (block 515). In one embodiment, the control logic may include one or more levels of multiplexers for determining the oldest ready instruction operation of all of the entries of the reservation station. After block 515, method 500 may return to block 505.

Figure 6:
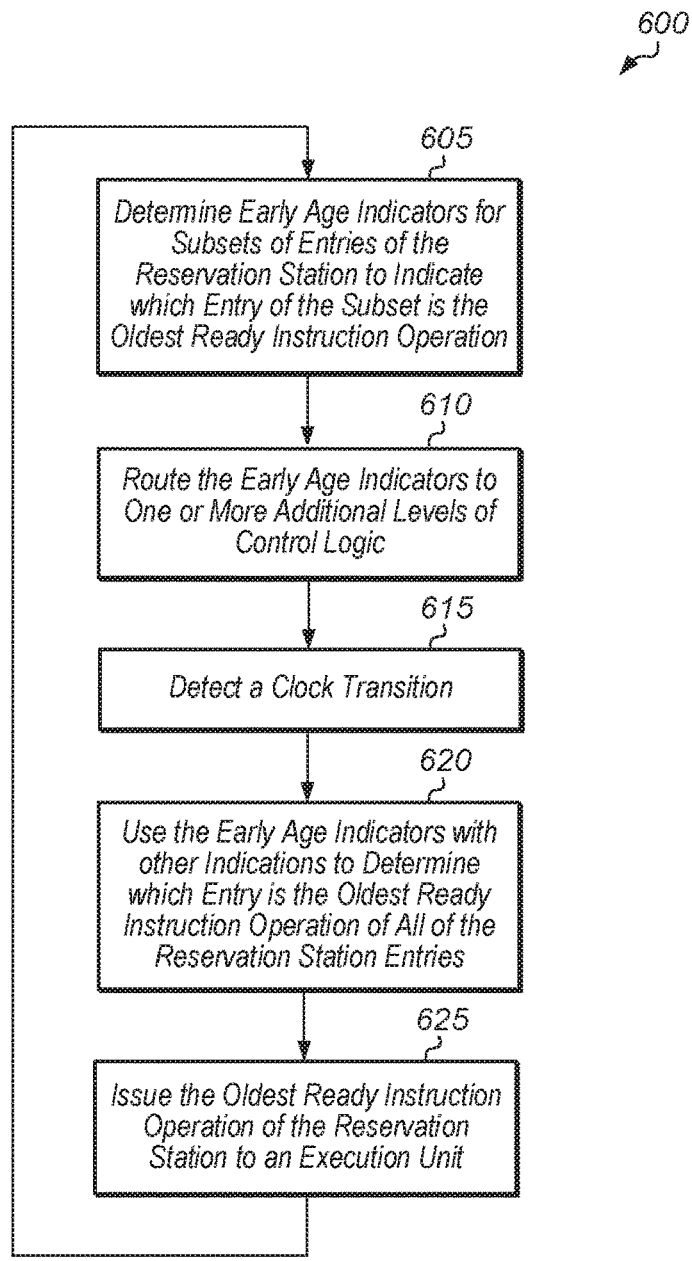
FIG. 6 is a generalized flow diagram illustrating one embodiment of a method for selecting the oldest ready instruction operation of a reservation station.

Referring now to FIG. 6, one embodiment of a method 600 for selecting the oldest ready instruction operation of a reservation station is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 600.

Control logic may determine early age indicators for subsets of entries of the reservation station to indicate which entry of the subset is the oldest ready instruction operation (block 605). In one embodiment, the control logic may determine an early age indicator for each pair of entries of the reservation station. The early age indicators may be generated based on one or more values that were valid in a previous clock cycle. Next, the early age indicators may be routed through registers into one or more levels of multiplexers of control logic (block 610).

Next, the control logic may detect a clock transition (block 615). Then, the control logic may use the early age indicators along with other indications to determine which entry is the oldest ready instruction operation of all the reservation station entries (block 620). The control logic may be configured to determine the oldest ready instruction operation for all of the entries of the reservation station without having to reconsider entries which were excluded (i.e., not selected as an oldest ready instruction operation) by the early age indicators. Next, the control logic may issue the oldest ready instruction operation of the reservation station to an execution unit (block 625). After block 625, method 600 may return to block 605.

By utilizing early age indicators to select the oldest ready instruction operation from the reservation station, the critical path of the age matrix may be reduced. Reducing the critical path of the age matrix allows instructions to be selected for execution at a higher rate, resulting in an increase in the number of instructions that can be executed by the processor in a given period of time. Any device using the processor would benefit by having increased capabilities resulting from the ability to execute instructions at a faster rate. This can be useful for devices with multi-tasking processors which perform multiple functions simultaneously. Furthermore, reducing the critical path of the age matrix may allow smaller logic gates to be used for implementing the critical path, resulting in power savings. For mobile devices which derive the energy required for their operation from batteries, a reduction in the power consumption of the mobile device's processor(s) can result in the device lasting longer on a single battery charge.

Figure 7:
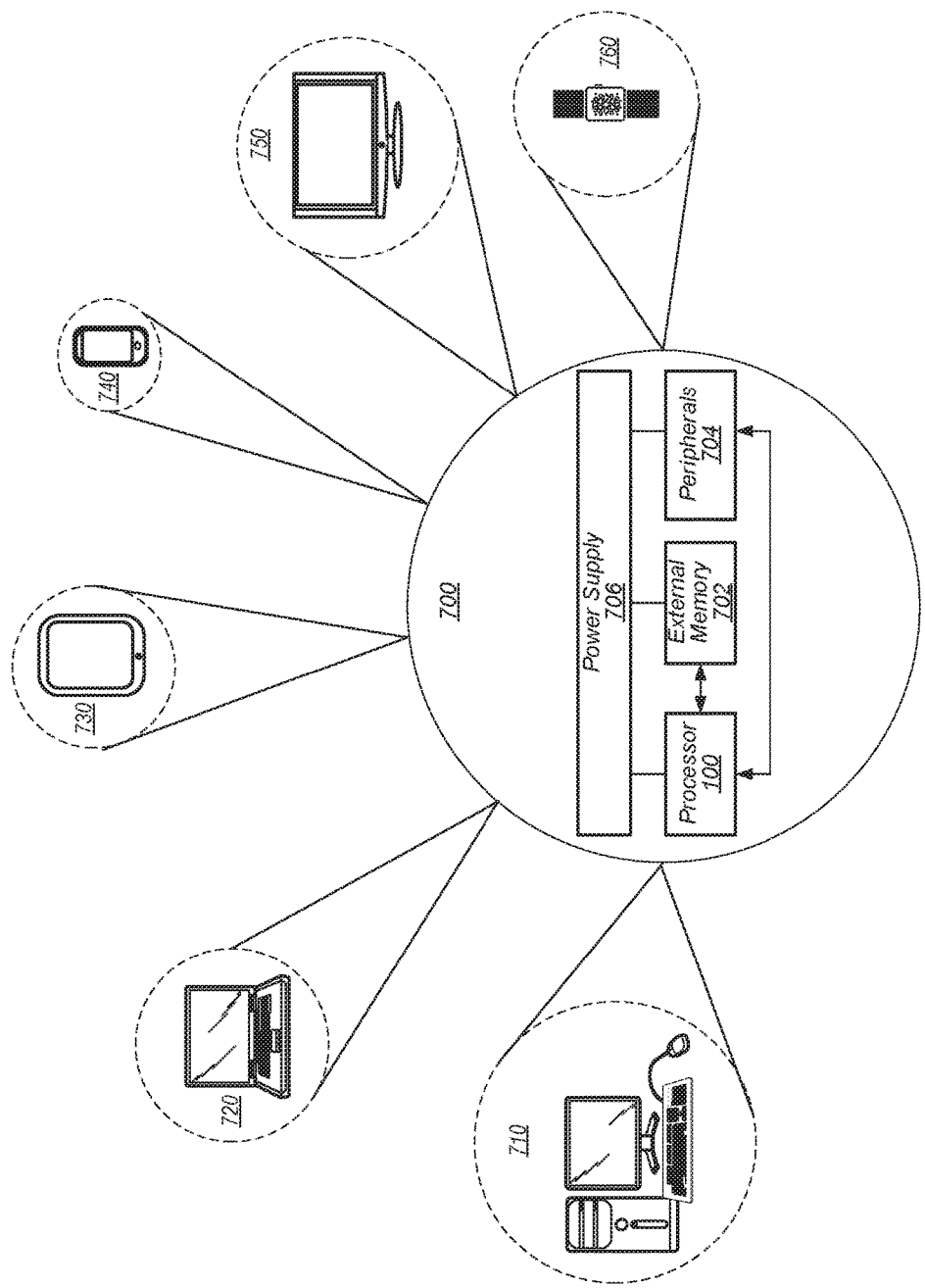
FIG. 7 is a block diagram of one embodiment of a system.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of processor 100 (of FIG. 1) coupled to an external memory 702. In various embodiments, processor 100 may be included within a system on chip (SoC) or integrated circuit (IC) which is coupled to external memory 702, peripherals 704, and power supply 706.

Processor 100 is coupled to one or more peripherals 704 and the external memory 702. A power supply 706 is also provided which supplies the supply voltages to processor 100 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of processor 100 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing processor 100 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

Figure 8:
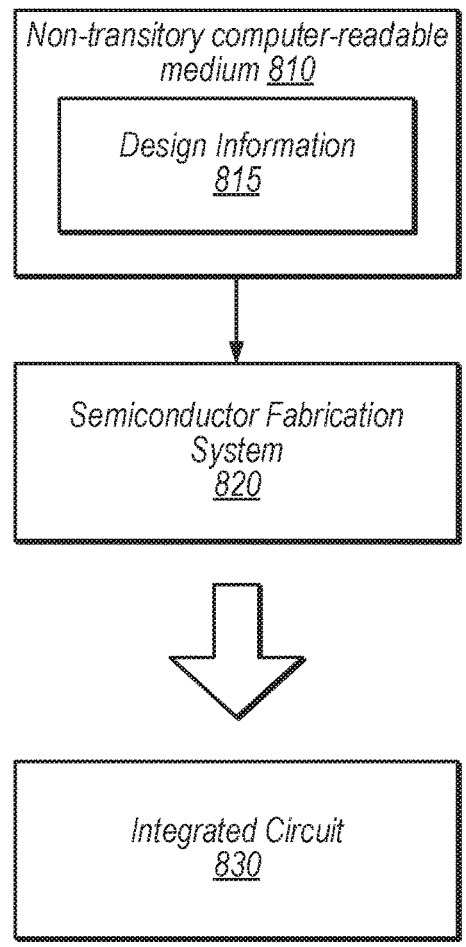
FIG. 8 is a block diagram illustrating an exemplary non-transitory computer-readable storage medium that stores circuit design information.

Referring now to FIG. 8, a block diagram illustrating an exemplary non-transitory computer-readable storage medium that stores circuit design information is shown. In the illustrated embodiment, semiconductor fabrication system 820 is configured to process the design information 815 stored on non-transitory computer-readable medium 810 and fabricate integrated circuit 830 based on the design information 815.

Non-transitory computer-readable medium 810 may comprise any of various appropriate types of memory devices or storage devices. Medium 810 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 810 may include other types of non-transitory memory as well or combinations thereof. Medium 810 may include two or more memory mediums which may reside in different locations (e.g., in different computer systems that are connected over a network).

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-4. Furthermore, integrated circuit 830 may be configured to perform various functions described herein in conjunction with other components. For example, integrated circuit 830 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   one or more execution units;
   a reservation station comprising a plurality of entries, wherein each entry is configured to store an instruction operation until being issued for execution by one of the one or more execution units;
   an age matrix for storing indications of a relative age of each instruction operation stored in the reservation station; and
   control logic configured to:
      determine in a first clock cycle a plurality of early age indicators for subsets of entries of the plurality of entries, wherein each early age indicator indicates which entry of a given subset has an oldest ready instruction operation;
      store the plurality of early age indicators in a plurality of registers during the first clock cycle; and
      access the plurality of registers to determine in a second clock cycle which entry of all entries in the reservation station has an oldest ready instruction operation without reconsidering entries which were excluded by the early age indicators.

2. The processor as recited in claim 1, wherein said early age indicators are determined based at least in part on indications from the age matrix generated in a clock cycle previous to the first clock cycle.

3. The processor as recited in claim 1, wherein the control logic is configured to determine the plurality of early age indicators based at least in part on status data from the first clock cycle, wherein the status data comprises one or more of ready indications, allocated indications, and valid indications.

4. The processor as recited in claim 1, wherein each of said subsets of entries comprise an adjacent pair of entries of the plurality of entries of the reservation station.

5. The processor as recited in claim 1, wherein the control logic is configured to determine, in the second clock cycle, the oldest ready instruction operation for all of the entries of the reservation station.

6. The processor as recited in claim 1, wherein the reservation station is further configured to select the oldest ready instruction operation from all of the entries of the reservation station for issuance to an execution unit.

7. The processor as recited in claim 1, wherein entries of the reservation station are randomly allocated.

8. A method comprising:
   storing instruction operations in a plurality of entries of a reservation station of a processor until being issued for execution by one of the one or more execution units; and
   determining in a first clock cycle a plurality of early age indicators for subsets of entries of the plurality of entries, wherein each early age indicator indicates which entry of a given subset has an oldest ready instruction operation; and
   storing the plurality of early age indicators in a plurality of registers during the first clock cycle;
   accessing the plurality of registers to determine in a second clock cycle which entry of all entries in the reservation station has an oldest ready instruction operation without reconsidering entries which were excluded by the early age indicators.

9. The method as recited in claim 8, wherein said early age indicators are determined based at least in part on indications from an age matrix generated in a clock cycle previous to the first clock cycle.

10. The method as recited in claim 8, further comprising determining the plurality of early age indicators based at least in part on status data from the first clock cycle, wherein the status data comprises one or more of ready indications, allocated indications, and valid indications.

11. The method as recited in claim 8, wherein each of said subsets of entries comprise an adjacent pair of entries of the plurality of entries of the reservation station.

12. The method as recited in claim 8, further comprising determining, in the second clock cycle, the oldest ready instruction operation for all of the entries of the reservation station.

13. The method as recited in claim 8, further comprising selecting the oldest ready instruction from all of the entries of the reservation station for issuance to an execution unit.

14. The method as recited in claim 8, further comprising randomly allocating entries of the reservation station.

15. A computing system comprising:
   a memory; and
   a processor comprising:
     an execution unit;
     a dispatch unit; and
     a reservation station comprising:
       a plurality of entries, each of the plurality of entries being configured to store an instruction operation prior to issuance to an execution unit;
       control logic configured to:
          determine in a first clock cycle a plurality of early age indicators for subsets of entries of the plurality of entries, wherein each early age indicator indicates which entry of a given subset has an oldest ready instruction operation;
          store the plurality of early age indicators in a plurality of registers during the first clock cycle;
          access the plurality of registers to determine in a second clock cycle, based on the determined plurality of early age indicators which entry of all entries in the reservation station has an oldest ready instruction operation without reconsidering entries which were excluded by the early age indicators;
       wherein the reservation station is configured to keep each instruction operation in an entry into which the instruction operation was originally written until issuance to an execution unit; and
       wherein the dispatch unit is configured to write an instruction operation to any of the plurality of entries of the reservation station.

16. The computing system as recited in claim 15, wherein said early age indicators are determined based at least in part on indications from the age matrix generated in a clock cycle previous to the first clock cycle.

17. The computing system as recited in claim 15, wherein the control logic is configured to determine the plurality of early age indicators based at least in part on status data from the first clock cycle, wherein the status data comprises one or more of ready indications, allocated indications, and valid indications.

18. The computing system as recited in claim 15, wherein each of said subsets of entries comprise an adjacent pair of entries of the plurality of entries of the reservation station.

19. The computing system as recited in claim 15, wherein the control logic is configured to determine, in the second clock cycle, the oldest ready instruction operation for all of the entries of the reservation station.

20. The computing system as recited in claim 15, wherein entries of the reservation station are randomly allocated.

\* \* \* \* \*